(12) United States Patent
Luciano

(10) Patent No.: US 8,328,368 B2
(45) Date of Patent: Dec. 11, 2012

(54) PROJECTION SYSTEM

(75) Inventor: Vincent Luciano, Farmingville, NY (US)

(73) Assignee: AccuVein Inc., Huntington, NY (US)

( * ) Notice: Subject to any disclaimer, the term of this patent is extended or adjusted under 35 U.S.C. 154(b) by 381 days.

(21) Appl. No.: 12/150,102

(22) Filed: Apr. 24, 2008

(65) Prior Publication Data

US 2009/0015799 A1    Jan. 15, 2009

Related U.S. Application Data

(60) Provisional application No. 60/926,332, filed on Apr. 26, 2007.

(51) Int. Cl.
*G03B 21/14* (2006.01)
*G03B 21/56* (2006.01)

(52) U.S. Cl. .............................. 353/79; 353/97; 359/460

(58) Field of Classification Search .................... 353/79, 353/80, 119, 122, 15, 69, 70, 97; 359/445, 359/460; 472/61

See application file for complete search history.

(56) References Cited

U.S. PATENT DOCUMENTS

| | | | |
|---|---|---|---|
| 5,214,458 A | 5/1993 | Kanai | |
| 5,541,820 A | 7/1996 | McLaughlin | |
| 5,988,817 A * | 11/1999 | Mizushima et al. | 353/94 |
| 6,135,599 A | 10/2000 | Fang | |
| 7,488,076 B2 * | 2/2009 | Era | 353/7 |
| 7,494,227 B2 * | 2/2009 | Yamazaki et al. | 353/85 |
| 2003/0227577 A1 * | 12/2003 | Allen et al. | 348/742 |
| 2004/0140982 A1 * | 7/2004 | Pate | 345/600 |
| 2005/0017924 A1 * | 1/2005 | Utt et al. | 345/32 |
| 2005/0141069 A1 | 6/2005 | Wood et al. | |
| 2005/0174777 A1 | 8/2005 | Cooper et al. | |
| 2006/0103811 A1 * | 5/2006 | May et al. | 353/69 |
| 2007/0002028 A1 * | 1/2007 | Morrison et al. | 345/173 |
| 2007/0064208 A1 * | 3/2007 | Giegerich et al. | 353/122 |
| 2007/0115435 A1 * | 5/2007 | Rosendaal | 353/30 |

FOREIGN PATENT DOCUMENTS

| | | | |
|---|---|---|---|
| JP | 08023501 A | * | 1/1996 |
| JP | 2002328428 A | * | 11/2002 |
| WO | WO 2005096073 A1 | * | 10/2005 |

\* cited by examiner

*Primary Examiner* — William C Dowling
*Assistant Examiner* — Ryan Howard
(74) *Attorney, Agent, or Firm* — Thomas A. O'Rourke; Booner & O'Rourke, LLP

(57) ABSTRACT

Miniature projection devices will enable the use of common household objects as the projection screen for still and moving images. This application describes a set of techniques and embodiments for implementing image projection inside a lamp such as a table or wall lamp and provides techniques for dealing with the unique physical attributes of lamps such as the shape of the lamp and the bright source of light that would tend to wash out the projected image. In addition, the invention presents a series of novel embodiments that respond changes in the environment to enable an immersive user experience and operation as a pet entertainment device.

64 Claims, 6 Drawing Sheets

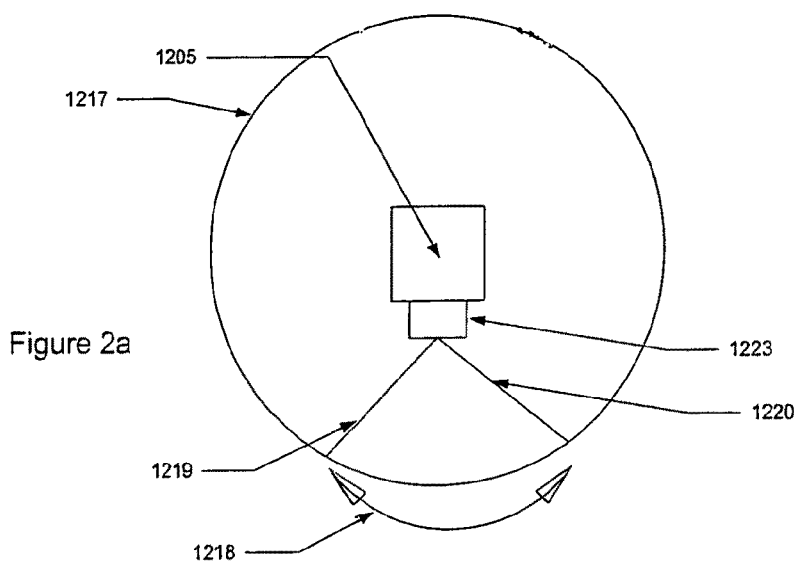
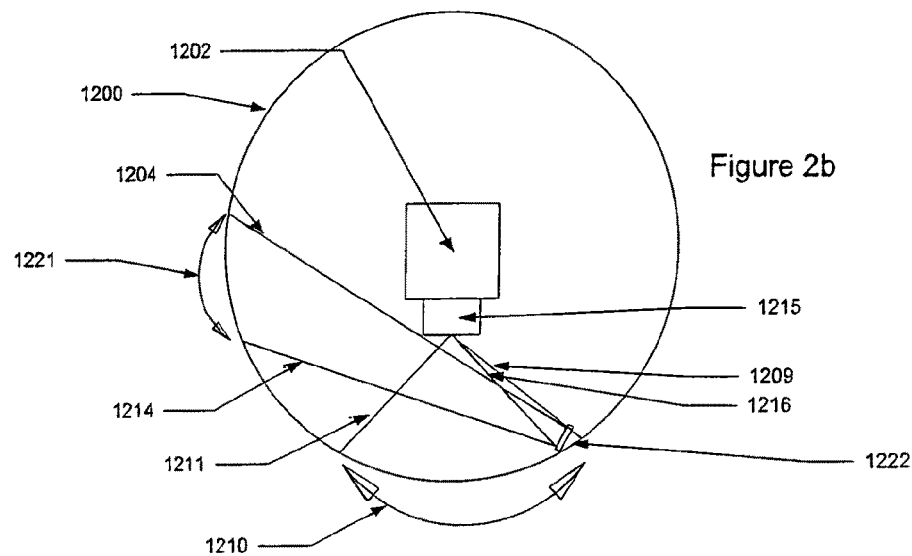
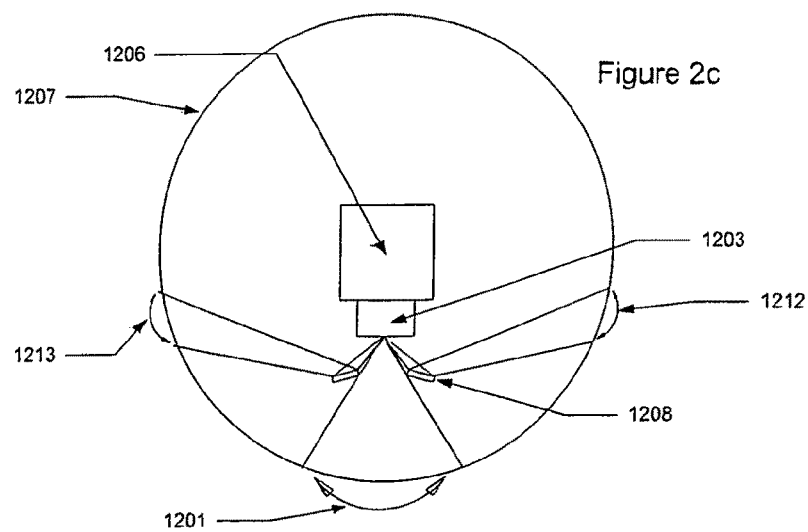

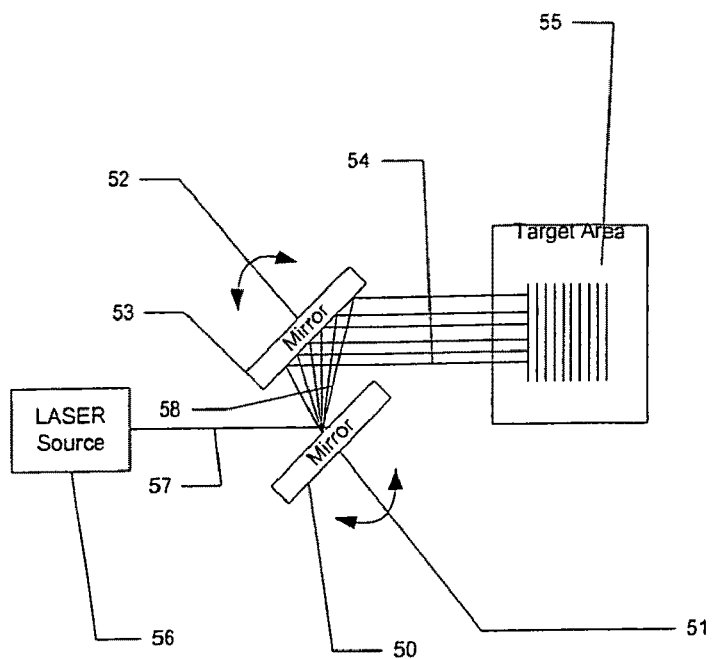
Figure 4a
Figure 4b
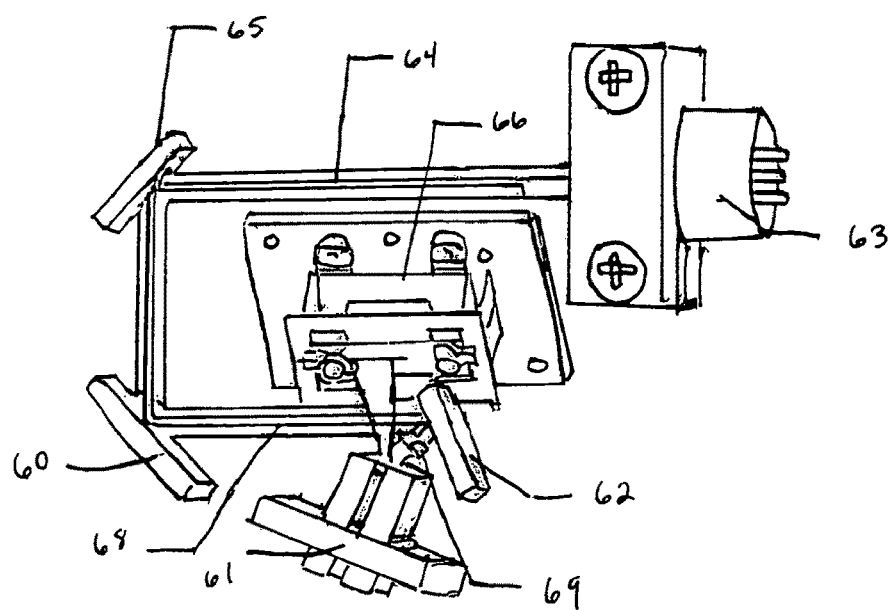

PROJECTION SYSTEM

This application claims priority on U.S. Application Ser. No. 60/926,332 filed Apr. 26, 2007, the disclosures of which are incorporated by reference.

FIELD OF INVENTION

Several products are in the early stage of production that use lasers and moving mirrors to project an image on a screen or other physical object. These so-called laser projection engines (LPE) are typically compact devices that provide all of the necessary mechanics, optics and electronics to create either a single color or multi-color display. An example of this type of LPE engine is the Microvision PicoP photonics module (http://www.microvision.com/proi.html). To quote their website, "With Microvision's IPM for mobile projection applications embedded into a device like a cell phone, the user realizes a visual experience where the image remains in focus at any distance, even on curved surfaces. The image has brilliant, saturated colors, from spectrally-pure lasers that provide exceptional contrast, giving depth and texture to the image in a continuous and uniform non-pixelated display."

Typical applications for these LPE engines are for small form factor projectors and as such are meant to displace traditional projection technologies such as Texas Instruments DLP micro-mirror projectors. Other applications include handheld devices with folding or roll-up screens so that the handheld devices can be made smaller by eliminating LCD displays.

BACKGROUND OF INVENTION

This invention is a series of novel applications of LPE technology that use objects commonly seen around the home and office as the target screen for the projected images, that I refer to as the "Common Object Display Projector," (CODP). These images can include photographs, moving video, animations—in fact any content that might be seen on the screen of a PC or a television are potential sources and types of images that can be projected on these non-traditional screens. Through the use of common household and office objects as the screen for the display, an enhanced environment can be created where the patterns seen on these objects no longer need to be fixed at the time of manufacture. For example, it is common in a home to put a wall paper border up around the ceiling. This border is a decorative element that is fixed at the time the border is printed. By using an LPE, a border can be projected that can be changed in real time.

One preferred embodiment is a lamp shade. Since the designer can control the size and shape and distance to the shade, it makes an excellent screen upon which to project content. In a traditional shade, the desired decorative pattern or pictorial on the lamp shade would need to be printed at the time of manufacture either directly on the shade or as an overlay on the shade. Changing that pattern would require the replacement of the shade or of the overlay. Through the use of a COPD, the pattern can be changed in real time. These patterns can be changed in response to many factors such as room occupancy, user input or changing conditions in the environment such as sounds or changing information from a remote location such as weather information from in home sensor or the internet.

OBJECTS OF THE INVENTION

1) Display fixed and moving images on things that are normal parts of the home or office environment
2) Integrate the image projector into these common objects either as part of the object as it is purchased by the consumer or as add-ons to these common objects
3) Change the images to match changes in the environment thereby creating an immersive user experience that corresponds to the environment.
4) Respond to local environmental changes by sensing the environment and respond to external environmental changes by communicating over a network or other communication channels providing information about the remote environment.
5) Provide a mechanism for updating the images projected and/or projecting images provided from a remote source.
6) Use the reflected light from the screen object to detect when the object is touched so as to allow for user input.
7) It is a goal of the invention to provide a cat entertainment mode.
8) It is a goal of the invention to operate as a standalone cat entertainment toy.

BRIEF DESCRIPTION OF DRAWINGS

FIG. 2 shows a mechanism to project the image around obstructions in the projection field FIG. 4 shows a schematic layout for a mechanism which projects an image using lasers and moving mirrors and a mechanical design for said device

DESCRIPTION OF INVENTION

Lasers have a unique attribute of almost unlimited focal length when compared typical projection systems that use lenses to focus the image at a specific distance from the lens. When a range of distances is desired the lens system needs to include an ability to adjust the focal distance to that of the target surface. Failure to do so will cause a fuzzy, out of focus image. These mechanisms are often complicated and expensive. Furthermore, the image must be projected on to a screen that is roughly flat so that the entire image stays in focus. Complex lens systems can be created that would allow for a complex shaped screen, but these are both costly and inflexible. For example, the shape of the screen would have to be known at the time of the design.

Since a laser beam holds its spot shape over a large working range, the invention is capable of projecting a focused image on to a complex shaped object as would typically be the case in an object that already exists in a home or office. A traditional optical projector would produce an image that is both distorted and out of focus on parts of the complex object, the laser projector would only be distorted. The system would be implemented such that the image is projected with appropriate distortions so that when viewed on the complex surface, the image appears correctly.

Even though a laser projector is the ideal technology to use for the implementation of the invention, other technologies are possible albeit with limitations. A more traditional projector such as an LCD or DLP projector can be used in place of the laser projector. In these embodiments, control of focus will require tradeoffs such as maintaining a constant distance to the target screen or using optical techniques and complex lenses to allow for multiple focal lengths.

The simplest embodiment for the invention is to use a projector that is mounted on the inside of a lamp assembly wherein the projector is pointed to the inside surface of the lamp shade and the area for the projected image is an unobstructed area in front of the projector. By using a translucent material for the screen, the projector/screen combination behaves as a rear-projection setup. If the lampshade is designed so that it is made up of flat surfaces and the projector is pointed directly at the screen, no image processing is necessary beyond the inversion necessary for rear projection. If the mechanics of the lamp require that the projector be at an angle to the screen, then keystone-style image processing would be needed to avoid visual distortion. This processing could be handled optically or digitally. Furthermore, as will be described later, since the shape of the image can be changed on a line by line basis, the LPE can directly project an image that has keystone correction 'built in.'

Figure 1A:
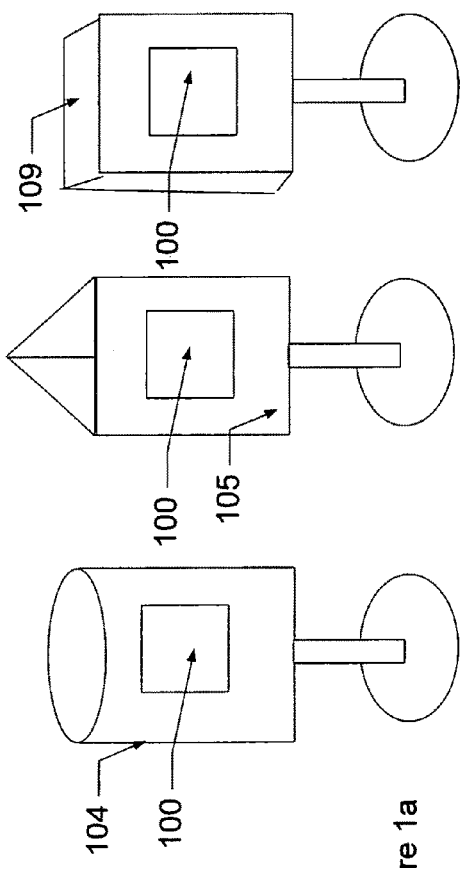
FIG. 1 shows a series of simple table lamps and projection embodiments
Figure 1B:
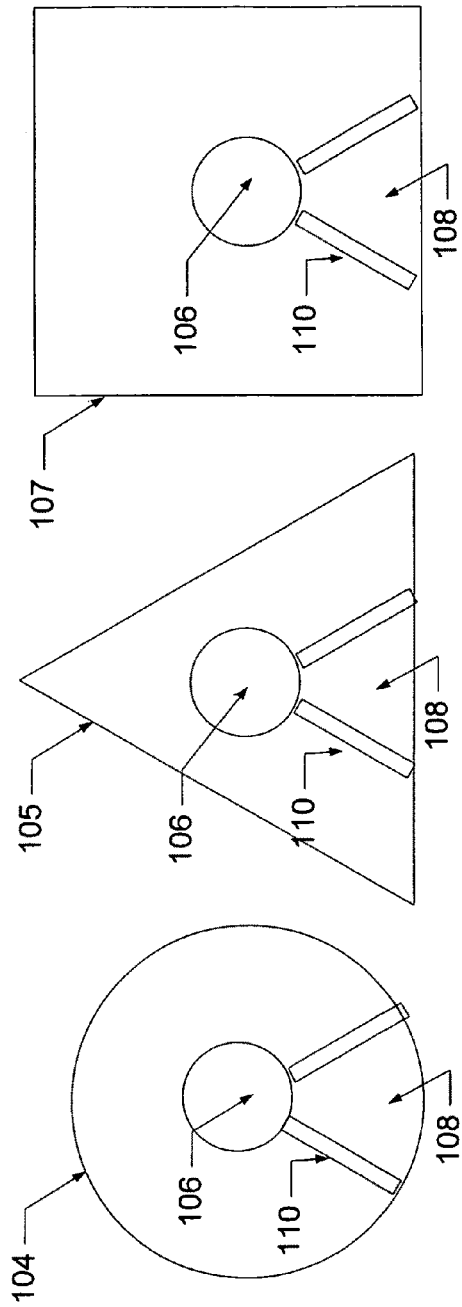

As seen in FIG. 1a, table lamps with various shaped shade assemblies can be used in a simple embodiment. The circular shade 104, triangular shade 105 and square shade 109 each contain a single projection target area 100 that is used as the screen for the projection. This simple arrangement allows for a relatively simple projector and projector configuration. In FIG. 1b, top views of the same lamps are shown. Also shown are the placement of the lamps bulb 106 which is used to provide the normal room illumination that is part of a table lamp. The projector element is not shown in this drawing since in this embodiment it is mounted below the light bulb. The projector's cone of light is shown at 108. This cone exits the projector itself and then strikes the lampshade 104, 105, 107. The translucent lamp shade behaves as a rear projection screen allowing the image to be viewed on the outside of the lamp. Also shown is an optional masking element 110. In the simplest embodiment, the projector would only operate when the bulb is off so that the brightly lit bulb doesn't wash out the projected image. Mask 110 is a cone (or other appropriately shaped object) of opaque material that runs from the projector to the screen area on the lamp. This mask blocks the bulb's light from the projection area, thereby allowing both the projector and the bulb to operate simultaneously.

In a more complex embodiment, the lampshade can be curved in one or more planes or could be more complexly shaped, such as a sphere. In this embodiment, while optical means are still a possibility, it is more likely that digital processing of the image could be used to distort the projected image so that when the image is viewed on the three dimensional shape of the shade it appears normal. This pre-distortion can be handled at any time prior to emitting the light from the projector. In one embodiment, so that only limited computing power is required, the images can be distorted prior to being sent to the projector, for example, prior to being stored in the memory of the system. This is a desirable implementation when all of the content is known prior to being placed on the screen, for example, photographs or pre-recorded video. In a more complex and expensive embodiment, the processing can be done in real-time as it is projected. This requires significantly more resources in the device but has the benefit of being able to project arbitrary content such as that from a front door or baby's room video camera.

An additional embodiment uses a globe shaped enclosure/screen so that images such as maps of the earth, other planetary bodies, and planetarium style starscapes can be projected. When combined with the touch feature described later, a fully interactive, fully animated globe can be implemented.

One of the challenges of the invention is the mechanical design of the lamp/projector combination. For example, in a typical table lamp, there is a central column that runs from the table to the top of the lamp. This assembly contains the mechanics for keeping the lamp stable on the table and mounting for the light source and the lamp shade. When viewing the lamp shade from any point within the shade and outside the central column, part of the shade will always be blocked from view by the central column. Therefore if the projector is in this space, there will be part of the shade that cannot be projected on to by said projector since it is in the shadow of the central column. Several mechanisms can be used to overcome this. In the simplest embodiment, the design of the shade and projector are such that only a limited portion of the shade is used as the projection screen. In such an implementation, by mounting the projector at a location that is not shadowed by the central column, the problem of the shadow is mitigated.

FIGS. 2a, 2b and 2c show three designs for projecting an image on to a non-flat screen and to parts of the screen that would otherwise be outside the normal throw of the projector. In all three figures, the lamp shade 1217, 1200, 1207 is shown as a circular embodiment. However, many shapes are possible. The lamp has a central column 1205, 1202, 1206 and a COPD engine 1215, 1203, 1223 mounted to said central column. As seen in FIG. 2a, the projector has a nominal throw bounded by 1219 and 1220. The projection screen area in FIG. 2a 1218 is the full width available to that particular embodiment of engine. FIG. 2b shows a mirror 1222 placed near the projection screen that reflects a portion of the image (bounded by 1209 and 1216) from the nominal screen area 1210 (bounded by 1211 and 1209) and on to a secondary projection area 1221 (bounded by 1214 and 1204. This embodiment therefore splits the display area over two sub-screens. Through the addition of additional mirrors, additional sub-screens can be added and by controlling the angle of the mirror, the sub-screens can be placed in the desired position on the shade. FIG. 2c shows an alternative embodiment where the mirrors 1208 are placed in proximity to the COPD engine, clipping and redirecting the edges of the projection area to alternative sub-screen positions 1213, 1212 leaving a smaller sub-screen 1201 directly in front of the engine.

One of the benefits of a COPD engine is that the mirror movement (speed) can be precisely controlled and does not need to be constant over its entire travel. The speed of a moving laser and the resolution of the projected image are subject to many physical limitations such as the maximum speed of the mirror, and the bandwidth of the electronic circuitry. Since the resolution of the display is a combination of these factors, by controlling the speed of the mirror so that it changes over the mirror's travel, areas of higher and lower resolution are possible. This is done by varying the modulation from the drive circuit so that the mirror moves less quickly in parts of its travel and more quickly in others. The increase in dwell time provides higher resolution in that area. The decrease in dwell time would reduce the resolution in that area. Therefore, this technique can be used to share the total available resolution of the COPD across each sub-screen in a manner appropriate to the design goals of the particular embodiment.

In another embodiment, the projector is mounted within the central column facing in a vertical direction (either up or down). The projection strikes a mirror or mirrors that are roughly conical so that the light is reflected so that it strikes the shade. The mounting mechanism can be implemented so that it is either:

1. A transparent tube so that while it can still be mechanically useful for holding the lamp assembly together, it does not cause undesirable shadowing of the projector. The distortions caused by such an assembly (if any) would need to be factored in to the pre-distortion of the image. Furthermore, it may be necessary to treat the transparent surfaces with anti-reflective coatings to avoid incidental reflections from interfering with the projected image.
2. A series of thin, roughly vertical members that mechanically secure the sections of the lamp, but only cause small shadows on the projected image.

In such an embodiment the image needs to be pre-processed to allow for the distortion created by the "wrap around" mirrors in addition to any processing needed to adapt for the shape of the lampshade/screen. Many other possible mechanical assemblies are possible including:

1. Using multiple projector elements each targeting one portion of the screen
2. Using a projector element that has multiple outputs each facing in different directions so that it behaves as if it were multiple separate projectors One of the challenges with combining a source of room light with a projection device is that the bright light of the room light will tend to wash out or completely hide the projected image. Furthermore, the light from typical illuminators will be uneven and will affect different parts of the image differently which is undesirable. Several solutions are possible. First, the size of the projected image can be made smaller which has the effect of making the image brighter. In this way the brighter projected image can compete more successfully with the room light source. Another embodiment would be to arrange the room light source and the projector such that the projected image is in a shadow so that the room light does not directly strike the area being used for a projection screen. This can be simply an additional opaque membrane that extends from the central core of the lamp to the shade such that the emitted room light only exits through part of the shade, leaving the shadowed portion of the shade for use as a projection screen.

While the preceding descriptions used the lampshade as the projection screen, the base of some lamp configurations can also be appropriate rear projection screens. For example a lamp with a globe-shaped base made of a translucent material could be used as a rear projection screen by mounting a COPD into the base assembly.

Given that the typical table lamp and other décor-type lamps are settable for a single level of brightness or at most a small number of levels of brightness, it is unusual for such a lamp to be used as a nightlight. Typically a smaller lamp would be used to provide a limited amount of illumination so that a room occupant can safely move around the room while the main light is off. The laser projection system is flexible enough such that it can be used to provide this nightlight function. Typically this would be implemented as a static lighting of the projection area such that it gives off sufficient light to act as a night light, but it is not distracting to the occupants who might be sleeping. However, many implementations are possible. Furthermore, as described elsewhere in this specification, nightlight can be one of the modes the device enters based on changes in the environment.

One of the goals of the invention is to respond to changes in the local environment in such a way that the content and mode of the projector reflects appropriate operation for the desires of the user. A typical example would be the projection of stimulating content when the user is active such as during the day and changing to more subtle, soothing content when the user is getting ready for sleep.

One of the key changes is the occupancy of the room in which the projector resides. For example, to extend the life of the projector and to minimize power usage, it would be desirable for the projector to be tuned off if there is no one present to observe the images.

All of these activation modalities can be used to provide positive or negative control to the projector. For example, in certain implementations it might be desirable for the projector to operate only when the lights are out (e.g., a child's nightlight) or only when the lights are on (e.g., a display in a museum that only operates when the exhibit is open). Furthermore, the activation modalities can also be used to change the content being projected (e.g., a news ticker when the lights are on and a starscape when the lights are off).

In the simplest implementation, the projector is connected to mains power and it is turned on and off by switching the mains on and off through the normal means of a wall switch or other power control mechanism known in the art such as X10 remote controls.

In another simple implementation, the projector is turned on and off via a switch controlled by the user. The switch can be of any type known in the art as long as it is capable of providing either an open/closed circuit or a digital indication of the on off state. In this embodiment, the user controls the on and off modes of the device. This switch could be integrated into the projector or integrated into the power cord.

There are many mechanisms known in the art to determine whether a room is occupied by detecting motion such as those typically seen in an alarm system. The projector can have an integrated motion sensing device integrated so that the device turns on when it senses motion in the environment. Alternatively, it may be desirable to have the sensor placed remotely for better coverage of the room. This separate device can be designed to communicate with the projector, informing it of the change in occupancy of the room. This connectivity can be wired or wireless using optical, audio or radio links.

There are many methods know in the art to detect light levels. In certain embodiments, it will be desirable to determine the ambient lighting conditions. This information can be used to change the intensity of the projection, bringing the intensity up in daylight and down in darkness. This change in intensity can be proportional to the light intensity or a simple high brightness/low brightness toggle.

It can also be used as an environmental input such that the mode of the projector changes based on lighting conditions. Furthermore, the light level can be combined with other inputs such as time to make better assumptions about what mode should be entered. For example, the display might be stimulating during the day, calming for a period of time after lights out and then shut off once no motion has been detected for a period of time based on the assumption that the occupants are asleep.

A novel implementation of light sensing would be to use a LPE known in the art that combines both projection and scanning. The scanning mode of the LPE uses knowledge of the instantaneous position of the scanning laser beam and a photo sensor to determine the reflected intensity of the light. In this mode the projector can capture an image of the object upon which it is projecting its picture. By sensing the output of the photo sensor while not projecting, the photo sensor can provide information about ambient light levels.

With any projection technology, as ambient light is increased, an image projected at a constant intensity will become harder and harder for the eye to see. The fixed image shape of a typical projector such as a DLP means that the intensity of the light needs to be increased as ambient light increases. This requires a tradeoff in cost of the projector. A low cost projector will typically have a dimmer light source and therefore will look washed out in a well lit room. A more expensive projector might have a brighter light source, but would still look washed out in daylight.

In an LPE based system, the output from the lasers can be increased or decreased in response to ambient light much in the same what it is done for traditional projector technologies, however, I can further change the size and shape of the projected area in an LPE-based projector so that once the ambient light exceeds the maximum output power of the lasers, the image size can be programmatically reduced so that the image, albeit smaller, is still visible.

Since the invention is designed to project images on ambient objects in a way that is entertaining or otherwise pleasurable or useful to the viewer, it is desirable to detect changes in the viewer's activities. One such way is to use the sound created by the room's occupant as a determinant of what the projector should project.

It is well known in the art of sound processing techniques to determine the tenor and content of language. The invention can use these sound processing techniques to determine information on the activities and mood of the room's occupants and to adjust the projection accordingly.

There are many environmental cues that can be taken from the sound in the room. This can be as simple as detecting a change in ambient sound and using that as an occupancy indication. New noise indicates that someone has entered the room. A drop in noise level can indicate that the occupant has left. Constant noise levels for a period of time can indicate that the occupant has either left the room or that the occupant is at rest. All of these environmental cues can be used to trigger a change in the projectors operation.

Sound information can also be used to determine specific information about the behavior or mood of the occupant. For example, voice analysis can be used to determine age and gender of the occupants. Also, stress levels of the occupants can be determined through voice analysis techniques. In an embodiment targeted at children, sound can be used to determine if the child is crying, laughing or talking.

Speech recognition technology can be used to provide an ability to control the projector such as a spoken "on" or "off." The complexity of the command set is only limited by the voice recognition software and the power of the processing that is available in the projector. These cost/feature tradeoffs will typically be made based on the demographics of the target markets.

In some embodiments of the invention it will be desirable to have sound synchronized with the projected image. For example, if an image from a nursery rhyme was being displayed on a lamp shade, music appropriate to that nursery rhyme would be played (e.g., twinkle-twinkle little star in conjunction with a starscape image). As with images, the content and volume of the audible output can be modified by what the system detects about its environment. The intent of this invention is that wherever projected images are discussed, these can also include a corresponding audio output.

Many types of images can be projected by the invention. For examples, fixed images such as bitmaps would be very common. These images can be delivered to and stored in the COPD in various formats that are well known in the art. For example, JEPG and TIFF images are commonly used on internet web pages. Other images might be algorithmically generated such as a checkerboard, a spiral or a crosshair pattern. Fonts are an example of a type of image that is a combination of both pre-stored and algorithmically generated images. Moving images such as videos and animations are also examples of what can be projected in the invention.

Since one of the primary purposes of the invention is for the images to be presented in an entertaining and decorative way, any of the techniques commonly used to enhance the introduction and removal of an image can be used in the invention. Such transitions commonly seen in PowerPoint presentations and in television shows can be used to enhance the presentation of images.

In a practical implementation, since this invention is meant to blend in with the home or office, it will be important for the device to change its behaviors and displayed content based on the current time of day. Time can be used as an absolute marker for change of behavior with an alarm clock embodiment as an example. In such an implementation the user would want to be able to set the device to a particular time of day (or multiple times in the day) and then have the device project a particular image or play a particular sound in conjunction with the image.

Time can also be used in conjunction with other inputs. For example, the images displayed during the day might be different than those displayed at night. This might use information about the time zone and sunrise/sunset times for that time zone or the same information for a zip code or a city/state combination.

In some embodiments it will be very valuable to have pre-printed content on the target object. For example, the target object might be a lamp shade for a child's room. It would be desirable that the lamp shade fits the décor of the room even when the projector is inactive. For example, a licensed character theme such as SpongeBob might be used throughout a child's room. The lamp shade is pre-printed with artwork that picks up on the theme, but the artwork is designed in such a way that it can be used in conjunction with projected content.

There are many child development toys that use patterns and images that are designed to be age appropriate based on the development of the human visual system. The patterns presented to the child are based on the child's age. The invention can be programmed with the child's date of birth and the invention can automatically change the image based on the changing age and development of the child.

One such way would be to leave bare areas interspersed with the printed areas. These could be large blank areas that are used as general projection targets or they could be more closely integrated with the printed areas such as the eyes or mouth on a character's face. By animating the picture of eyes or mouth moving, the normally still character can become interactive. The designer of the specific embodiment can make cost/feature tradeoffs by minimizing the projected area thereby lowering the resolution and therefore cost of the LPE engine or by using a monochrome LPE engine vs. a full color engine.

Another way to minimize cost while still providing strong integration with the printed materials is to coat areas of the pre-printed image with ultraviolet light sensitive phosphors. An LPE can be selected that uses a single UV laser and that laser can paint appropriate images on to the phosphor treated areas. Color can be provided by appropriate selection of phosphor materials.

Aligning the projected image with the printed image is an important requirement of this design. A low cost method of alignment is the use of mechanical keying so that the projection targets are forced into alignment with the LPE engine. A second alternative is to use an LPE engine that supports image capture and place registration marks on the projection target.

By reading the location of these targets, the system can automatically align the image. The designer can choose to have these alignment marks visible and integrated into the printed image or by choosing an LPE that sees outside of the light spectrum that is visible to the human eye, the designer can place invisible registration marks on the screen.

As discussed above, a methodology of aligning the projector and the target screen is required. In many embodiments, pre-existing objects will be used as the projection target, for example, the wall. In certain circumstances, it will be acceptable to physically orient the projection device. In others, automatic methodologies would be more user-friendly.

One method is for the user to align the projector to a particular position. In most cases this will be the least costly way of implementing alignment. However, if the projector moves (perhaps by being bumped into) then it will need to be realigned by the user. In many ways this is the same issue as crooked pictures on the wall. Someone needs to fix them, but many people don't. Therefore, it would be very desirable for an automatic methodology to be provided.

In an embodiment that uses an LPE that is capable of capturing an image, then once the image is aligned at a particular position, the image capture functionality can be used to capture an image of the target area. Image processing technique well known in the art can be used to capture unique patterns in the image. Periodically, the LPE can re-image the target area, find those registration patterns and then realign the projected image to the pre-set target area.

Another way to identify the proper location on the wall, ceiling or other object would be to place detectable registration marks on the target area. This could be stick on, glue on or painted on markers that contain registration marks that are either visible or invisible to a human but visible to the image capture technology of the LPE engine. Many LPE engines are very flexible in where they project the image. Often the total available travel of the moving mirrors is greater than the actual travel that is used for projecting the image. In fact, the further the engine is from the target screen, the more likely that the desired image will be a smaller subset of the total mirror travel. In this situation, by adding or removing an offset to when the active area of the projection begins the position upon which the visible image is projected can be moved without physically moving the LPE engine.

A further extension for positioning the image would be to mount the projection component on a moveable assembly such as a pan and/or tilt and/or zoom assembly. In this way the entire projection area can be moved as the projection component is moved. Alternatively, a mirror mounted to a pan and/or tilt and/or zoom assembly can be moved to reposition the projected image.

The basic elements of the invention include:
1. A light source for illuminating the room
2. A projector for emitting the images
3. A screen that both diffuses the illumination and acts as a screen for the projected image As in a typical lamp, other elements may include switches for controlling on, off or intensity, decorative elements that provide an appropriate appearance to fit the room décor, mounting mechanisms such as stands, clamps or other bases, and wiring for a power supply.

The invention can be embodied in any of the typical configurations seen for room lamps. This would include table lamps, wall mounted lamps such as a sconce, and ceiling mounted lamps with and without an integrated ceiling fan.

There are many desirable embodiments of the invention that are based on the general construction of a table lamp. Typically such a lamp has a central column supported by a stand. At the top of the central column are the light source (light bulb) and an attachment mechanism for the lamp shade. The shade wraps around the bulb, typically at some distance to act as a diffuser for the light source and as a decorative element for the table lamp. Shades are found in many different shapes and sizes including round, oval and rectangular. The invention can make use of any shape shade since laser light sources remain focused over very large working ranges.

One of the challenges with the invention is delivering content to the projector. There are a number of ways of accomplishing this. In the simplest embodiment, there would be a series of pre-stored images in the projector that would remain unchanged over the life of the device. A more capable implementation would allow the changing of or the addition of content through mechanisms including:
1. The use of a memory card that is inserted into the COPD that either would be kept with the projector so the content can be drawn from the memory card or the content can be copied to local memory for use and the card can be removed
2. Through the use of machine readable markings on paper or other similar carriers which are then presented into the projection field and are read. An examples of the technology that could be used is the 2 dimensional bar code PDF-417
3. Through the use of a wireless communication mechanism such as optical (e.g., IRDA), RF (e.g., 802.11g) or audio (e.g., modem tones).

The data provided to the owner of the COPD can be delivered to the user on a one-time purchase basis or on a subscription basis wherein the user gets new images over time.

In embodiments that provide a robust communication scheme, the communication interface can be used for additional capabilities including image download, firmware/software upgrades and license management.

Figure 3A:
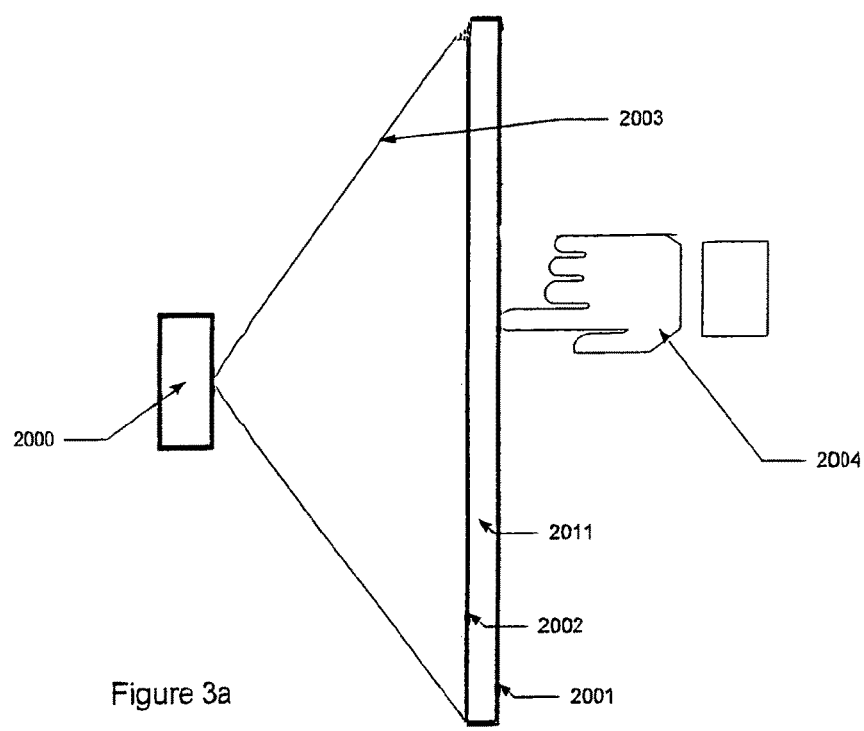
FIG. 3 shows the combination of a projector and a user input device
Figure 3B:
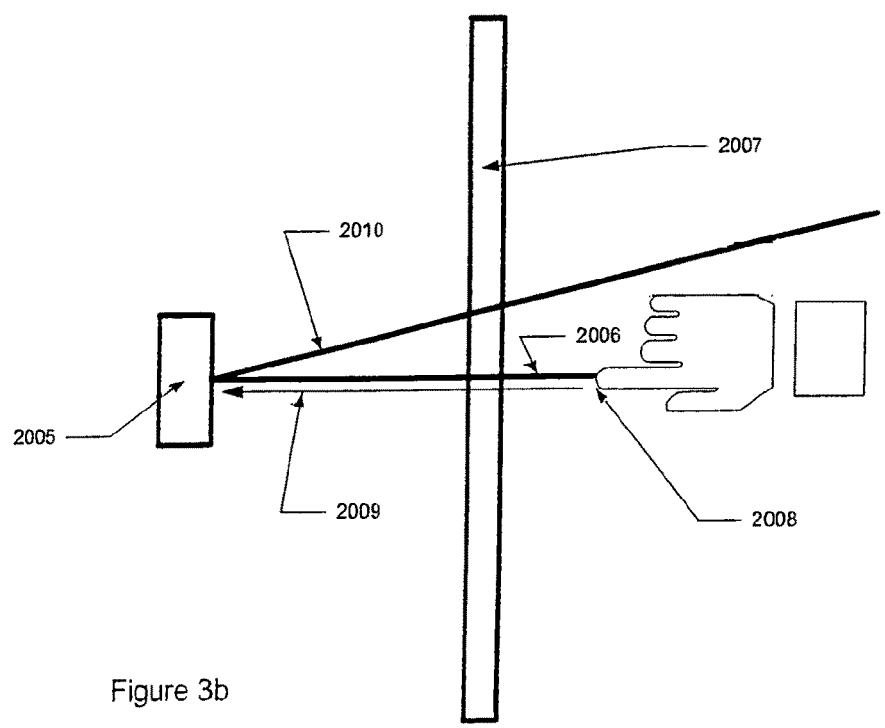

Referring to FIG. 3a, a CODP 2000 is shown that projects an image (bounded by 2003) on to a screen 2011 that is made of a material such as latex that is translucent in the visible spectrum and transparent in the infrared spectrum. The image is projected on to the rear of the screen 2002 and is viewed by a user on the front of the screen 2001. The COPD contains a laser or lasers that project an image in visible light and an additional laser that is coaxial with the other lasers that projects a beam of infrared light. The visible light is diffused by the screen so that an image is seen on the front of the screen 2001. However, since the screen material is chosen so that it is transparent to infrared, the majority of the infrared beam continues through the screen. When an object, such as a finger 2004, is placed near or in contact with the outside of the screen 2001, some of the infrared light that has passed through the screen is reflected back through the screen and towards the COPD. For example, FIG. 3b shows a COPD 2005 transmitting a scanned infrared laser beam 2010/2006 towards the screen 2007 and into the space outside the screen. As the finger 2008 comes into proximity of the outside of the screen, when the laser is pointing away 2010 from the finger, there is no object to reflect back any of the light to the COPD. When the laser scans to the finger, light is reflected back to the COPD. By tracking the position of the scanning beam, the COPD and measure the amount of infrared reflected back to it 2009 and thereby determine the position (or positions) of an object (or objects) on the outside of the screen. By either providing pre-printed user interface indicators on the outside of the screen 2006, or by projecting user interface indicators, the system can determine when a user touches an indicator and can then respond appropriately.

There are many inventions that are intended to provide entertainment and/or exercise for a cat. Many of these inventions use the spot of light produced by a moving laser. The cat perceives the moving spot of light as prey and chases the moving spot. This invention describes a variation of the invention that uses it to create a small, low cost, highly capable moving spot laser cat toy In U.S. Pat. No. 5,443,036 titled "Method of exercising a cat" a triggered, gun shaped, handheld, laser pointer is described. Our invention improves on this implementation in that it does not require the user to participate in the movement of the laser.

U.S. Pat. No. 6,505,576 titled "Pet Toy" describes a pet toy that uses a motor and cams to directly move the light source, then reflecting that light source off a mirror so as to project a moving spot. Our invention moves lower mass mirrors thereby reducing power consumption and system complexity. It further improves on this implementation in that it provides additional mounting flexibility since the laser is highly steerable. Also due to the enhanced steering, the spot can be moved in any desired pattern since the pattern is not a result of interactions in the mechanical assembly, but is a result of the driving software program or circuitry.

U.S. Pat. No. 6,557,495 titled "Laser Pet Toy" describes an improved embodiment in that it provides more flexible mounting, but the pattern of the laser spot's travel is still a result of the cam/motor mechanism which our invention avoids.

In U.S. Pat. No. 6,651,591 titled "Automatic Laser Pet Toy and Exerciser" a novel motor system is described that uses the expansion and contraction of nitinol when heated to provide motion for the spot. Our invention uses electrically driven mirrors to provide the laser motion.

U.S. Pat. No. 6,701,872 titled "Method and apparatus for automatically exercising a curious animal" describes an implementation of a moving spot laser toy that uses an arrangement much like an oscillating, floor mounted, fan. Our invention is flexibly mounted and allows more complex steering of the laser spot.

U.S. Pat. No. 7,066,780 titled "Pet Entertainment Device" and US Patent Application 2007/0056531 both describe variations of the moving laser spot toy, but they are different in that they are worn by the pet.

Necessary to the invention are a source of laser light, a mirror or mirrors that can move in one or more axes such that as the mirrors move, the incident laser light is reflected in a controllable direction, and a control mechanism that steers the spot in a pattern that is perceived as prey by the cat. Optional capabilities of the invention include a safety interlock mechanism, and intermediate mirrors for repositioning the laser beam within the invention itself and external control inputs for user interaction.

FIG. 4a shows a two mirror system that is used to move the spot over a two dimensional area. The laser source 56 is oriented so that the beam 57 strikes the mirror 50 at the appropriate angle and position. Intermediate bounce mirrors could be placed in the beam path 57 to reorient the beam. Mirror 50 is a moving mirror with an axis of motion shown at 51. The now moving beam of light 58 is directed to moving mirror 53. Mirror 53 has an axis of motion 52 that is oriented at an angle such as 90 degrees from the axis of motion of mirror 50 shown at 51. In this manner, the laser light 54 reflected off of mirror 52 can be steered to any point in target area 55. A single mirror that is capable of motion in two axes can be used to replace the two mirrors. This same mechanism can be used for moving the spot in a raster pattern for the lamp shade projector embodiments of the invention.

There are multiple steering algorithms that can be used in the invention. The first is to move the mirrors in concert such that the spot directly traces the pattern desired. A second approach is to rapidly move the spot at high speed in a repeating pattern such that the laser spot passes over every point in the target area in each repeat. An example of this would be a raster pattern as is used in a CRT-based television. By modulating the laser on and off in synchrony with the scanning of the pattern, the spot can be made to appear to move. An advantage of this second mode is that images can replace the simple moving spot. In the first mode, similar effects can be implemented by moving the laser rapidly to draw the outline of a desired image and moving the placement of that image from moment to moment so that the image moves in the desired pattern.

In FIG. 4b, a diagram of a prototype laser and mirror engine is shown. A laser diode 63 is used as the source of laser light. Within the laser housing focusing optics are provided that adjust the beam collimation to the desired working length. The laser beam 64 is emitted from the laser diode 63 and strikes fold mirrors 65, 60, and 62. These mirrors are used to reorient the laser beam 67, 68 and 69 in the desired direction and any number may be included in a particular embodiment depending on the orientation of the components. This prototype provides a high speed mirror 61 and a low speed mirror 66. Such an implementation would allow for both moving spot and raster projection. If two low speed mirrors were used, the embodiment would only allow for moving spot projection. After the laser beam 69 bounces off of the fold mirror 62, it then strikes moving mirror 61. This moves the beam in the first axis. The reflected moving beam then strikes mirror 66 and is moved in the second axis. In the orientation of FIG. 2, the final moving beam would exit the assembly in the direction of the reader.

Figure 6:
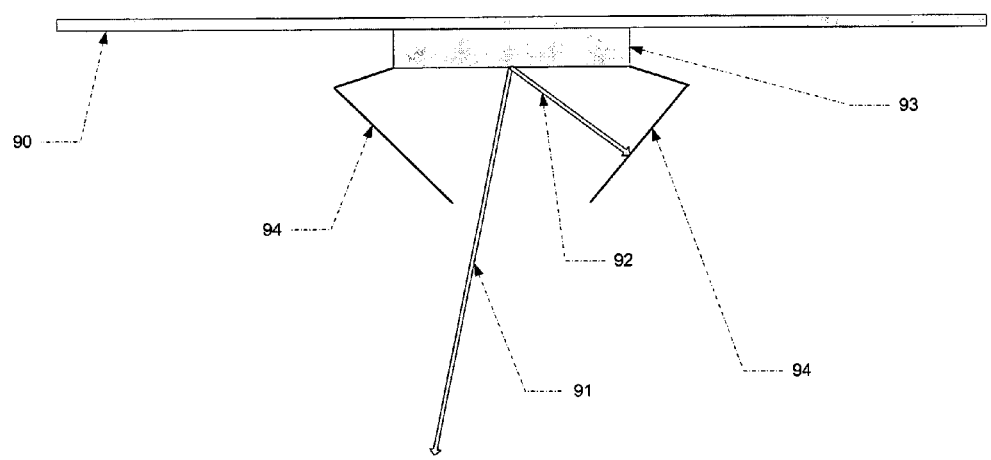
FIG. 6 shows an alternative design for a ceiling mounted lamp

A preferred embodiment of the invention is where it is part of a ceiling lamp. By providing an opening in the lamp shade, when the laser is steered through this hole, the spot is projected into the room and can behave as a pet toy. When the laser is steered so as to strike the shade it can project decorative images on to that portion of the shade. Since the shade is translucent, the images projected are visible to the room occupants. Referring to FIG. 6, the invention 93 is mounted to the ceiling 90. The lamp shade 94 is shaped so that in addition to a screen that is visible to the room occupants, there is an opening in the shade so that the laser beam 91 can project towards the floor or wall and act as a moving spot cat toy. When the beam 92 is deflected so as to strike the shade, any images that can be projected by the laser are seen as if they were rear projected on to the translucent shade 94.

Figure 5B:
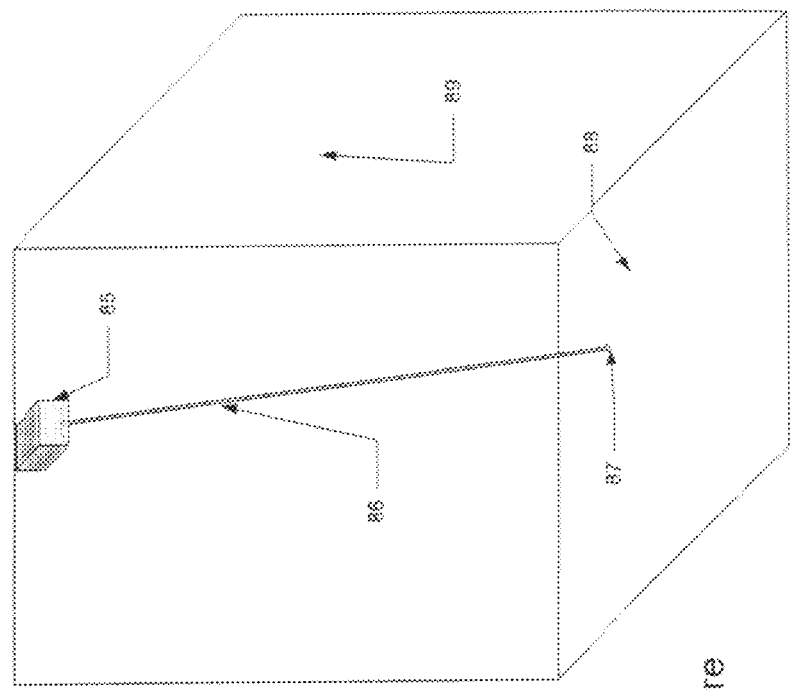
FIG. 5 shows mounting alternatives for using the device as a cat toy
Figure 5A:
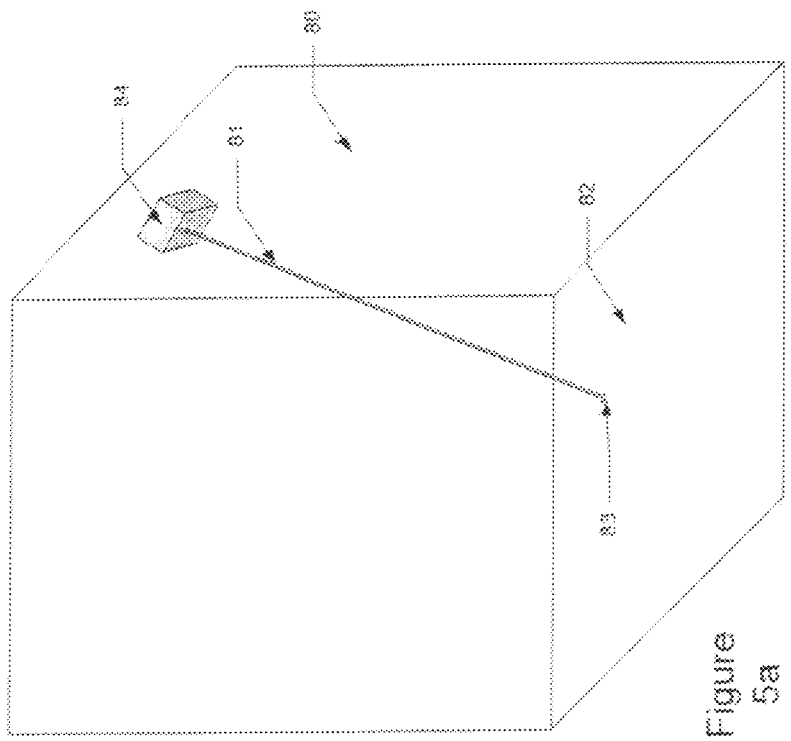

Additional embodiments include stand-alone wall or ceiling mounted units that provide the functionality of an image projector or an enhanced cat toy or both. Referring to FIG. 5a, the invention 84 is mounted on the wall 80. The invention is oriented such that the laser beam 81 projects towards the floor 82 and is seen by the occupants of the room as spot 83. As the beam is moved by the invention, the spot also moves. Referring to FIG. 5b, a ceiling mounted version of the invention 85 is shown on the ceiling, oriented so that the laser beam 86 creates a moving spot 87 on the floor 88 or the wall 89.

It is desirable that the motion of the laser spot have significant similarity to the behavior of prey being chased by the cat. When an owner uses a handheld laser pointer to play with a cat, the owner can modify the pattern of spot motion to make it interesting to the cat. In an automatic system there are many methods of maximizing the cat's interest in the moving spot.

There are decades of video and film of both domestic and wild animals exhibiting hunting behavior including stalking and chasing prey. Through analysis of these sources typical prey behavior can be determined. With the addition of a programmable or pre-programmed control circuit, the beam can be made to trace the normal patterns of chased prey. Randomization algorithms can be used to have the different patterns displayed in changing orders and random motion can also be added to the behavior of the moving spot.

In the home, there are likely to be objects such as sofas and tables that would get in the way of the moving spot. Several mechanisms can be used to have the moving spot avoid these obstructions. The first assumes that there is good contrast between the floor or floor covering and the objects in the room. By detecting the amount of reflection from the laser, the invention can discriminate between objects of high reflectance and low reflectance. For example a light colored floor covering and a dark sofa would reflect light differently. The steering mechanism uses the amount of reflection to either prefer or avoid areas of low reflectance and vice versa.

A second mechanism is to provide the user with reflective objects that can be placed or adhered to the boundaries for operation. In this way the problem of low contrast between the floor and room objects can be eliminated since the objects can have very high reflection when compared to normal room furnishings.

A third mechanism allows the user through the use of a remote control to place the invention in a configuration mode and steer the beam around the area the user desires for the cat toy to operate. By selecting the outline of the area or the corners of the area, the user can define the "keep in" and "keep out" areas for the operation of the device.

None of the existing inventions provide the ability to ensure laser safety since they do not provide an interlock between motion of the spot and enabling the laser. Therefore, these inventions must use the highest safe power for a non-moving spot. Since our enhanced pet toy can turn the laser off if a failure causes the spot to stop moving, a brighter spot can be projected.

Many types of moving mirrors can be used in the invention. For example, the Texas Instruments TALP 4500 low speed mirror is a single axis mirror that has the necessary attributes. A pair of these devices can be arranged as previously described. It is desirable to maximize the output of the laser so that a bright spot is projected that is viewable in high ambient light. All laser devices have governmental safety agency regulations dictating power output limitations. These limitations are typically expressed as a maximum output of the laser at a given distance from the eye over some period of time. Therefore, a number of techniques that control power output and the time profile of the output can be used to ensure that the device meets these safety criteria. This balance between high power, yielding brighter images, and safety are an important part of the design of the device.

In one embodiment, a photo detector can be used to determine how much light is reflected from the laser as it strikes the objects in the room. Although there will be great variation in reflection from different objects in the room, as those objects get closer to the source of the laser, the average reflection will increase. This would be the case if an individual were to bring their face closer to the device. As the laser intensity of the reflection seen by the photo detector increases, the output of the laser can be decreased so as to keep the brightness within safety requirements. This intensity variation can be implemented using analog techniques such as decreasing the power to the laser source or using digital techniques such as pulse width modulation.

A further safety mechanism can be implemented when mirrors include a sensor that provides mirror position or mirror motion information. The referenced TI mirror has such a sensor. Circuitry can monitor the position or motion of the mirror and disable the laser should the actual motion of the mirror not match the expected motion of the mirror.

There are many ways in which a pet owner would wish the invention to interact with their cat. One methodology would be to entertain the cat during long absences of the owner ("absence mode") such as when the owner is at work. Another mode is to allow the owner to observe the play time of the cat ("play mode"). Most owners would prefer the ability for the device to offer both modes. Each of these modes requires a different user interface. In the absence mode, the preferred implementation would be for the device to operate on a timed basis. Either with default settings or through entry by the pet owner either on/off durations or on/off time of day could be set to meet the desire of the owner. A further embodiment would be to use environmental sensors to either replace or supplement the time-based settings. Through techniques well known in the art, environmental cues such as sound can be used to activate the toy. For example, a microphone, audio circuitry and signal processing can be used to listen for and detect a cat meowing. Another implementation could use burglar-alarm style motion sensors to detect pet movement before activating the toy. Pre-set or user-set limitations on how much time the toy can be on in a period of time are a further enhancement of any of these sensor-based modalities.

There are several desirable alternatives for operation in play mode. Since the preferred embodiment has the device mounted on the wall or on the ceiling it is not normally accessible to the pet owner. Therefore the ability to remotely control the device is very desirable. Remote control mechanisms can include a simple on/off capability or more complex interactions with the device such as mode setting. The remote control mechanisms can either be a physical device such as a pull chain like those seen in ceiling fans, sound-based such as the infamous "clapper," or a physical remote control such as an infrared TV-style remote control. The TV-style remote control is particularly desirable in that such devices are relatively inexpensive and by using a standard code set, an existing multi-device universal remote could be used to control the device eliminating the need for a separate remote.

As described earlier, the preferred embodiment for the invention automatically moves the spot in a pattern that simulates prey behavior. However, in many circumstances the pet owner would prefer to interact with the pet. Through the use of a remote control that includes cursor, joy-stick or accelerometer type user interface, the pet owner can steer the beam directly. In addition, in an embodiment that provides computer communication, software can be provided that allows the pet owner to define their own paths for spot movement and then download those paths to the invention.

Then invention can be enhanced with various communication schemes beyond the universal remote control described above. Standard data communication schemes such as optical (e.g., IRDA) or RF (e.g., Wifi, Bluetooth, Zigbee) or wired (e.g., RS-232 serial, Ethernet).

Throughout this document certain terms are used whose meanings are clarified as follows:

1. The terms images, videos, pictures, animations are used interchangeably and refer to all types of digital media.
2. The term projector is used in this document to refer to both the projector device itself in a stand-alone implementation as well as the object in which the projector is integrated. For example, in our lamp shade implementation, projector refers to the projection device itself, the shade and the lamp itself.

3. Whenever I refer to a user or a viewer this should be interpreted to mean either individuals or a group of individuals.

4. Lamp "shade" should be interpreted as any transparent or translucent or partially transparent or partially translucent covering that is placed between a light source and the eye of a room occupant. For example, this would include the cloth shade typical of a table lamp as well as a glass or plastic covering typical of a ceiling mounted lamp.

I claim:

1. A lamp comprising:
a traditional light source for providing illumination,
a projector for projecting images,
a projection surface comprising a shaped lamp-shade for receiving said projected images from said projector; said projector being mounted to project to an inside surface of said lamp shade; said shaped lamp shade comprising a translucent material to form a rear projection system;
image processing to prevent image distortion at said shaped lamp shade;
one or more opaque masking elements, said one or more opaque masking elements blocking illumination from said traditional light source at said projection surface of said lamp shade to allow simultaneous projector and light source operation.

2. The lamp according to claim 1, wherein said traditional light source is from the group of light sources consisting of: an incandescent bulb, a florescent bulb, a halogen bulb, or an LED; and wherein said projector comprises a laser light projector.

3. The lamp according to claim 1 further comprising one or more moveable mirrors, said one or more mirrors being located near said shaped lamp shade to reflect a portion of said received image onto at least a secondary projection area.

4. The lamp according to claim 1 wherein said projected images comprise one or more of: fixed images and moving images, said fixed images comprising one or more bitmap image and said moving images comprising a video image; and wherein said images are delivered to said projector by one or more of: images being pre-stored in said projector, by inserting a memory card of images into said projector, and by downloading images.

5. The lamp according to claim 1, wherein said shaped lamp shade comprises one or more of: a lamp shade with a circular cross-section; a lamp shade with a triangular cross-section; a lamp shade with a rectangular cross-section; a globe-shaped lamp shade; and a complex curved shape lamp shade.

6. The lamp according to claim 1, further comprising a controller for controlling said projector to modify said projected image as a function of an activation modality.

7. The lamp according to claim 6, wherein said activation modality comprises a current time; and wherein said projector displays content based on said current time.

8. The lamp according to claim 6, wherein said activation modality comprises ambient light being detected by a photo sensor; and wherein said photo sensor causes said controller to increase intensity of said projected image with increasing ambient light, and causes said controller to decrease intensity of said projected image with decreasing ambient light.

9. The lamp according to claim 6, wherein said activation modality comprises detection of motion; and wherein when a motion sensor detects motion, said projector is activated.

10. The lamp according to claim 6, wherein said activation modality comprises a noise level, and wherein new noise indicates a room is occupied and triggers said activation of said projector, and wherein a drop in noise level indicates a room is unoccupied and causes said projector to cease said projection.

11. The lamp according to claim 6, wherein said activation modality comprises detection of the illumination state of said traditional light source.

12. The lamp according to claim 5, wherein said lamp shade comprises a material permitting rear projection and said activation modality comprises detection of an object touching a side of said lamp shade.

13. The lamp according to claim 7, wherein said controller modifies said image contents to be patterns and images designed to be age appropriate based on the development of the human visual system to benefit child development.

14. The lamp according to claim 13, wherein said controller modifies said image according to a child's date of birth to automatically change content of said projected image based on age and development.

15. The lamp according to claim 1, wherein said projection surface comprises a supporting structure connecting a base of the lamp to the traditional light source.

16. The lamp according to claim 3, wherein said one or more movable mirrors comprise at least two moveable mirrors; and wherein said at least two moveable mirrors are moved in concert using a steering algorithm.

17. A lamp comprising:
a traditional light source for providing illumination,
a laser projection engine for projecting images, and
a controller for controlling said laser projection engine to modify said projected image as a function of an activation modality, said activation modality comprising one or more of: speech recognition, noise level detection, motion detection, ambient light level detection, a time of the day, and a level of illumination of said traditional light source; and
one or more opaque masking elements, said one or more opaque masking elements blocking illumination from said traditional light source at said projected image to permit simultaneous operation of said projector and said light source.

18. The lamp according to claim 17, wherein said projected image is projected onto one or more of: a lamp shade being attached to said lamp, and an object distal to said lamp.

19. The lamp according to claim 18, wherein said projection of images comprises projection onto a non-planar surface, and wherein keystone image processing is used to prevent image distortion at said non-planar surface.

20. The lamp according to claim 19 further comprising one or more moveable mirrors, said one or more mirrors being located near said lamp shade to reflect a portion of said projected image onto at least a secondary projection area.

21. The lamp according to claim 20, wherein said lamp shade comprises a translucent material that functions as a rear projection surface, and wherein said image is projected on a inner surface of said lamp shade.

22. An image projection apparatus for combining a source of room light with a projection device without wash-out of a projected image, said image projection apparatus comprising:
a lamp assembly, said lamp assembly comprising: a base, a central column extending away from said base, a light emitting means for emitting light in at least the visual spectrum for providing illumination, and a shade assembly positioned on said central column, said shade comprising a translucent material being usable as a rear projection screen, said shade assembly comprising a shaped lamp shade having an inside and an outside surface and at least one projection target area on said inside surface of said shade, said shaped lamp shade comprising one or more of: a lamp shade having a circular cross-section; a lamp shade having a triangular cross-section; a lamp shade having a rectangular cross-section; a globe-shaped lamp shade; and a complex curve-shape lamp shade;

a laser projection engine, said laser projection engine being adapted to project said image on said at least one projection target area on said inside surface of said lamp shade; said images being delivered to said projector by one or more of: being pre-stored in said projector, by inserting a memory card into said projector, and by download said images;

a controller for controlling said laser projection engine to modify said projected image as a function of an activation modality, said activation modality comprising one or more of: speech recognition, noise level detection, motion detection, ambient light level detection using a photo sensor, a time of the day, and a level of illumination of said light emitting means;

one or more moveable mirrors, said one or more mirrors being located near said shaped lamp shade to reflect a portion of said projected image onto at least a secondary projection area;

one or more opaque masking elements, said one or more opaque masking elements blocking light from said light emitting mean at said projected image to permit simultaneous operation of said projector and said light source.

23. An image projection apparatus according to claim 22, wherein when said activation modality comprises a current time of day, said projector displays content based on said current time of day;

wherein when said activation modality comprises ambient light; said photo sensor causes said controller to increase intensity of said projected image with increasing ambient light, and causes said controller to decrease intensity of said projected image with decreasing ambient light;

wherein when said activation modality comprises detection of motion; and wherein when a motion sensor detects motion, said projector is activated; and wherein when said activation modality comprises a noise level, new noise indicates a room is occupied and triggers said activation of said projector, and a drop in noise level indicates a room is unoccupied and causes said projector to cease said projection.

24. A lamp comprising:
a traditional light source to provide illumination;
a projector for projecting images, said projector being mounted proximate to said traditional light source;
a projection surface for receiving said projected images from said projector;
one or more opaque masking elements, said one or more opaque masking elements blocking at least a portion of said illumination from said traditional light source; said one or more opaque masking elements serving to block illumination from reaching said projection surface to allow for simultaneous projector and light source operation.

25. The lamp according to claim 24 further comprising one or more moveable mirrors, said one or more mirrors being located near said projector to reflect a portion of said projected image onto at least a secondary projection area.

26. The lamp according to claim 25 further comprising a shaped lamp shade for receiving at least a portion of said projected image; and wherein said shaped lamp shade comprises one or more of: a lamp shade with a circular cross-section; a lamp shade with a triangular cross-section; a lamp shade with a rectangular cross-section; a globe-shaped lamp shade; and a complex curved shape lamp shade.

27. The lamp according to claim 26, wherein said one or more movable mirrors comprise at least two moveable mirrors; and wherein said at least two moveable mirrors are moved in concert using a steering algorithm.

28. The lamp according to claim 27, further comprising a controller for controlling said projector to modify said projected image according to an activation modality.

29. The lamp according to claim 28, wherein said activation modality comprises a current time; and wherein said projector displays content based on said current time.

30. The lamp according to claim 28, wherein said activation modality comprises ambient light being detected by a photo sensor; and wherein said photo sensor causes said controller to increase intensity of said projected image with increasing ambient light, and causes said controller to decrease intensity of said projected image with decreasing ambient light.

31. The lamp according to claim 28, wherein said activation modality comprises a noise level, and wherein additional noise indicates a room is occupied and triggers said activation of said projector, and wherein a drop in noise level indicates a room is unoccupied and causes said projector to cease said projection.

32. The lamp according to claim 26, wherein said lamp shade comprises a translucent material permitting rear projection of said image.

33. The lamp according to claim 28, wherein said controller modifies said image to be patterns and images designed to be age appropriate based on the development of the human visual system to benefit child development.

34. The lamp according to claim 28, wherein said controller modifies said image according to a child's date of birth to automatically change content of said projected image based on age and development.

35. A lamp comprising:
a projector for projecting one or more types of projections, said projector comprising one or more of: a laser projection engine; and a projector utilizing a digital micromirror device;
a lamp shade assembly, said lamp shade comprising a translucent material being usable for receiving said one or more types of projections, as a rear projection screen;
a photo sensor, said photo sensor being capable of detecting an ambient light level;
a controller for controlling said projector to modify said one or more types of projections as a function of a change in a local environment;
wherein said change in said local environment comprises a change in said ambient light level being detected by said photo sensor to cause said modification of said projected image, said change in said ambient light level causing said controller to modify an intensity of said one or more types of projections; and
wherein when said projector is a laser projection engine and when said controller increases said intensity of said projection in response to increasing ambient light levels to be at a maximum power, said controller thereafter responds to any further increase in said detected ambient light level by reducing a size of said projected image to still be visible.

36. A lamp in accordance with claim 35, wherein said one or more types of projections comprise: image projection, and projection of static lighting.

37. A lamp in accordance with claim 36, wherein said controller causes a change in intensity of said projection from said projector to be proportional to said ambient light level.

38. A lamp in accordance with claim 37, wherein said controller causes said projector to turn off when said ambient light level comprises a high level of brightness; and wherein said controller causes said projector to turn on when said ambient light level comprises a low level of brightness.

39. A lamp in accordance with claim 38, wherein said controller causes said projector to project a sufficient amount of light to act as a night light.

40. A lamp in accordance with claim 39, wherein said projector acting as a night light is by projection of a starscape.

41. A lamp in accordance with claim 39, wherein said projector acting as a night light is by projection of an image from a video camera in a baby's room.

42. A lamp in accordance with claim 39 further comprising a motion detector;
and wherein said controller causes said projector to cease functioning as a night light when said controller determines that a room occupant falls asleep, said controller determining said room occupant falls asleep when no motion is detected by said motion detector for a period of time.

43. A lamp in accordance with claim 42 further comprising a traditional light source and one or more opaque masking elements; said one or more opaque masking elements blocking light from said traditional light source at said projection to permit simultaneous operation of said projector and said traditional light source to provide illumination in combination with said one or more projection types.

44. A lamp in accordance with claim 43, wherein said change in said local environment comprises one or more of: speech recognition, noise level detection, a current time of day, and a level of illumination of said traditional light source.

45. A lamp in accordance with claim 44,
wherein when said change in said local environment comprises said speech recognition, said controller controlling said projector to turn on or off in response to a spoken command;
wherein when said change in said local environment comprises said noise level, detecting new noise indicates a room is occupied and triggers said activation of said projector, and detecting a drop in noise level indicates a room is unoccupied and causes said projector to cease said projection;
wherein when said change in said local environment comprises said current time of day, said projector displays content based on said current time of day; and
wherein when said change in said local environment comprises said level of illumination of said traditional light source, said controller causes said projector to modify said intensity of said one or more types of projections to be proportional to said level of illumination of said traditional light source.

46. A lamp in accordance with claim 45, wherein said lamp shade comprises a shaped lamp shade, said shaped lamp shade comprising one or more of: a lamp shade with a circular cross-section; a lamp shade with a triangular cross-section; a lamp shade with a rectangular cross-section; a globe-shaped lamp shade; and a complex curve-shaped lamp shade.

47. A lamp in accordance with claim 46 further comprising digital processing of said one or more projection types for projection onto said shaped lamp shade.

48. A lamp in accordance with claim 47 further comprising one or more moveable mirrors, said one or more mirrors being located near said shaped lamp shade to reflect a portion of said one or more projection types onto at least a secondary projection area.

49. A lamp in accordance with claim 48, wherein when said one or more types of projections comprise image projection, said images for said images projection are delivered to said projector by one or more of: being pre-stored in a memory in said projector, by inserting a memory card into said projector, and by downloading said images.

50. A lamp comprising:
a projector for projecting one or more types of projections;
a lamp shade assembly, said lamp shade comprising a translucent material being usable for receiving said one or more types of projections, as a rear projection screen;
a photo sensor, said photo sensor being capable of detecting an ambient light level;
a controller for controlling said projector to modify said one or more types of projections as a function of a change in a local environment; and
wherein said projector is a laser projector and where said controller increases intensity of said projection in response to increasing ambient light levels to be at a maximum power of said laser projector, said controller thereafter responds to any further increase in said detected ambient light level by changing the shape of said one or more projection types.

51. A lamp in accordance with claim 50 wherein said controller changing the shape of said one or more projection types comprises reducing the size of said projection.

52. A lamp in accordance with claim 51 wherein said controller causes only portions of the original image to be displayed.

53. A lamp in accordance with claim 52, wherein said controller causes said projector to turn off when said ambient light level comprises a high level of brightness; and wherein said controller causes said projector to turn on when said ambient light level comprises a low level of brightness.

54. A lamp in accordance with claim 53, wherein said controller causes said projector to project a sufficient amount of light to act as a night light.

55. A lamp in accordance with claim 54, wherein said projector acting as a night light is by projection of a starscape.

56. A lamp in accordance with claim 55, wherein said projector acting as a night light is by projection of an image from a video camera in a baby's room.

57. A lamp in accordance with claim 56 further comprising a motion detector;
and wherein said controller causes said projector to cease functioning as a night light when said controller determines that a room occupant falls asleep, said controller determining said room occupant falls asleep when no motion is detected by said motion detector for a period of time.

58. A lamp in accordance with claim 57 further comprising a traditional light source and one or more opaque masking elements; said one or more opaque masking elements blocking light from said traditional light source at said projection to permit simultaneous operation of said projector and said traditional light source to provide illumination in combination with said one or more projection types.

59. A lamp in accordance with claim 58, wherein said change in said local environment comprises one or more of: speech recognition, noise level detection, a current time of day, and a level of illumination of said traditional light source.

60. A lamp in accordance with claim 59,
wherein when said change in said local environment comprises said speech recognition, said controller controlling said projector to turn on or off in response to a spoken command;
wherein when said change in said local environment comprises said noise level, detecting new noise indicates a room is occupied and triggers said activation of said projector, and detecting a drop in noise level indicates a room is unoccupied and causes said projector to cease said projection;
wherein when said change in said local environment comprises said current time of day, said projector displays content based on said current time of day; and
wherein when said change in said local environment comprises said level of illumination of said traditional light source, said controller causes said projector to modify said intensity of said one or more types of projections to be proportional to said level of illumination of said traditional light source.

61. A lamp in accordance with claim 60, wherein said lamp shade comprises a shaped lamp shade, said shaped lamp shade comprising one or more of: a lamp shade with a circular cross-section; a lamp shade with a triangular cross-section; a lamp shade with a rectangular cross-section; a globe-shaped lamp shade; and a complex curve-shaped lamp shade.

62. A lamp in accordance with claim 61 further comprising digital processing of said one or more projection types for projection onto said shaped lamp shade.

63. A lamp in accordance with claim 62 further comprising one or more moveable mirrors, said one or more mirrors being located near said shaped lamp shade to reflect a portion of said one or more projection types onto at least a secondary projection area.

64. A lamp in accordance with claim 63, wherein when said one or more types of projections comprise image projection, said images for said images projection are delivered to said projector by one or more of: being pre-stored in a memory in said projector, by inserting a memory card into said projector, and by downloading said images.

* * * * *